United States Patent
Komizo et al.

(10) Patent No.: US 12,092,853 B2
(45) Date of Patent: *Sep. 17, 2024

(54) LIGHT-GUIDE PLATE, AREA LIGHT SOURCE DEVICE, DISPLAY DEVICE, MANUFACTURING METHOD FOR LIGHT GUIDE PLATE

(71) Applicant: Dai Nippon Printing Co., Ltd., Tokyo (JP)

(72) Inventors: Kohei Komizo, Tokyo (JP); Tetsuya Sadahiro, Tokyo (JP); Hironori Hashiguchi, Tokyo (JP); Koujiro Ohkawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,432

(22) Filed: Nov. 8, 2023

(65) Prior Publication Data

US 2024/0077665 A1 Mar. 7, 2024

Related U.S. Application Data

(60) Continuation of application No. 18/046,201, filed on Oct. 13, 2022, which is a division of application No.
(Continued)

(51) Int. Cl.
*F21V 8/00* (2006.01)
*G02F 1/13357* (2006.01)

(52) U.S. Cl.
CPC ..... *G02B 6/0036* (2013.01); *G02F 1/133615* (2013.01)

(58) Field of Classification Search
CPC ...... B29D 11/00682; B29K 2995/0031; G02F 1/133615; G02B 6/02038
See application file for complete search history.

(56) References Cited

U.S. PATENT DOCUMENTS 3,874,782 A * 4/1975 Schmidt .................. G02F 1/011
385/7
4,582,655 A 4/1986 Greener
(Continued)

FOREIGN PATENT DOCUMENTS

| CN | 1900784 A | 1/2007 |
|---|---|---|
| JP | 2003-207646 A | 7/2003 |

(Continued)

OTHER PUBLICATIONS

International Search Report and Written Opinion (Application No. PCT/JP2018/015748) dated Jul. 3, 2018.
(Continued)

*Primary Examiner* — Fatima N Farokhrooz
(74) *Attorney, Agent, or Firm* — BURR PATENT LAW, PLLC (57) ABSTRACT

Provided are a light guide plate, an area light source device, a display device, and manufacturing method for the light guide plate such that the occurrence of uneven luminance is suppressed. The light guide plate is characterized in that the light guide plate has a light entrance surface through which light enters, a light exit surface intersecting with the light entrance surface and through which light is output, and an opposite surface facing the light entrance surface, wherein the light entering through the light entrance surface is guided to the opposite surface side and output from the light exit surface, and the refractive index Nx in a direction perpendicular to the light entrance surface is higher than the refractive index Ny in a direction parallel to the light exit surface and parallel to the light entrance surface.

8 Claims, 5 Drawing Sheets

Related U.S. Application Data

17/047,163, filed as application No. PCT/JP2018/015748 on Apr. 16, 2018, now Pat. No. 11,513,276.

(56) References Cited

U.S. PATENT DOCUMENTS

| | | | |
|---|---|---|---|
| 5,442,482 A | 8/1995 | Johnson et al. | |
| 6,341,872 B1 | 1/2002 | Goto | |
| 6,940,570 B1 | 9/2005 | Sumida et al. | |
| 7,379,130 B1 | 5/2008 | Bhalla | |
| 10,737,450 B1 | 8/2020 | Ouderkirk | |
| 10,802,195 B1 | 10/2020 | Sprague | |
| 2003/0099037 A1 | 5/2003 | Jagt et al. | |
| 2003/0179563 A1 | 9/2003 | Masuda | |
| 2010/0046219 A1 | 2/2010 | Pijlman et al. | |
| 2010/0231826 A1 | 9/2010 | Itou et al. | |
| 2011/0216270 A1 | 9/2011 | Koyama et al. | |
| 2011/0221998 A1* | 9/2011 | Adachi | G02B 6/0038 362/19 |
| 2011/0242298 A1 | 10/2011 | Bathiche et al. | |
| 2012/0120489 A1 | 5/2012 | Kitson et al. | |
| 2013/0222737 A1 | 8/2013 | Mizutani | |
| 2013/0242610 A1 | 9/2013 | Ochi et al. | |
| 2016/0306090 A1 | 10/2016 | Pu et al. | |
| 2016/0377798 A1 | 12/2016 | Dhar | |
| 2017/0299799 A1 | 10/2017 | Fattal | |

FOREIGN PATENT DOCUMENTS

| | | |
|---|---|---|
| JP | 2006-261088 A1 | 9/2006 |
| JP | 2008-020747 A1 | 1/2008 |
| JP | 2009-217283 A1 | 9/2009 |
| JP | 2009-231018 A | 10/2009 |
| JP | 2013-050470 A1 | 3/2013 |
| JP | 2014-056772 | 3/2014 |
| JP | 2017-228359 A1 | 12/2017 |

OTHER PUBLICATIONS

U.S. Office Action dated May 21, 2024 (U.S. Appl. No. 18/046,201).

* cited by examiner

LIGHT-GUIDE PLATE, AREA LIGHT SOURCE DEVICE, DISPLAY DEVICE, MANUFACTURING METHOD FOR LIGHT GUIDE PLATE

CROSS REFERENCE TO RELATED APPLICATION

This application is a continuation of U.S. application Ser. No. 18/046,201, filed Oct. 13, 2022, which in turn is a division of U.S. application Ser. No. 17/047,163, filed Oct. 13, 2020, now U.S. Pat. No. 11,513,276, issued Nov. 29, 2022, which in turn is the National Stage entry of International Application No. PCT/JP2018/015748, filed Apr. 16, 2018, which designated the United States, the entireties of which are incorporated herein by reference.

FIELD OF THE INVENTION

The present invention relates to a light guide plate, a surface light source device, a display device, and a manufacturing method for the light guide plate.

BACKGROUND OF THE INVENTION

There has been conventionally known a display device in which a display portion such as an LCD (Liquid Crystal Display) panel is illuminated by a surface light source device and an image is displayed thereon. Surface light source devices are roughly classified into a directly-below type in which a light source is disposed directly below an optical member such as various optical sheets, and an edge-light type in which the light source is disposed on a side of the optical member. Of these, in the edge-light type surface light source device, the light source is disposed on the side of the optical member such as a light guide plate, and therefore it has an advantage that the surface light source device can be further thinned as compared with the directly-below type one, and has been widely used in recent years.

In general, in the edge-light type surface light source device, the light source is disposed at a position facing a light entrance surface which is a side surface of the light guide plate, the light emitted from the light source enters the light guide plate through the light entrance surface, and travels in a direction (light guide direction) orthogonal to the light entrance surface from the light entrance surface toward the facing surface facing the light entrance surface while repeating the reflection by the light exit surface and the back surface facing the light exit surface. The traveling direction of the light is changed by a projection and recess shape and the like provided in the light guide plate, and therefore the light is emitted little by little from each position along the light guide direction of the light exit surface toward the LCD panel side (for example, Patent Document 1). Although some of such light guide plates may be manufactured by an extrusion method by which a resin is formed by extrusion, in such a case, leakage of light that has entered through the light entrance surface occurs, and emission lines are seen in the light exit surface, that is, luminance unevenness occurs in some cases.

Patent Document 1: Japanese Unexamined Patent Application, Publication No. 2009-217283

SUMMARY OF THE INVENTION

Problems to be Solved by the Invention

An object of the present invention is to provide a light guide plate, a surface light source device, a display device, and a manufacturing method for the light guide plate which are capable of suppressing occurrence of luminance unevenness.

Means for Solving the Problems

The present invention solves the problem using the following solution means. Even though a description will be given by assigning reference numerals corresponding to embodiments of the present invention for easy understanding, the present invention is not limited thereto. In addition, a configuration described by assigning a reference numeral thereto may be modified as appropriate, and at least a part thereof may be replaced with another component. A first invention provides a light guide plate (12) comprising a light entrance surface (12a) through which light enters, a light exit surface (12c) that intersects with the light entrance surface and from which the light is emitted, and a facing surface (12b) that faces the light entrance surface, wherein the light having entered through the light entrance surface is guided to the facing surface side, and is emitted from the light exit surface, and a refractive index Nx in a direction perpendicular to the light entrance surface is higher than a refractive index Ny in a direction parallel to the light exit surface and parallel to the light entrance surface. A second invention provides a surface light source device (10) comprising the light guide plate (12) of the first invention, and a light source portion (11) that is provided at a position facing the light entrance surface (12a) of the light guide plate and emits the light to the light entrance surface. A third invention provides a display device (1) comprising the surface light source device (10) of the second invention, and a display portion (2) that is disposed on a side of the light exit surface (12c) of the light guide plate (12) provided in the surface light source device. A fourth invention provides the display device (1) of the third invention, wherein the display portion (2) is a reflection type display portion. A fifth invention provides a manufacturing method for a light guide plate of manufacturing the light guide plate (12) of the first invention by an extrusion method, the method comprising a resin extrusion step of extruding a resin forming the light guide plate into a forming plate (70) having a projection and recess shaped portion (73) corresponding to a shape of the light guide plate, and a light guide plate forming step of pressing the forming plate while conveying the resin extruded in the resin extrusion step and forming the light guide plate, wherein the forming plate is disposed so that a surface (73a) of the projection and recess shaped portion, the surface corresponding to the light entrance surface (12a), is orthogonal to a conveying direction (S) of the resin.

Effects of the Invention

According to the present invention, the occurrence of luminance unevenness can be suppressed.

DETAILED DESCRIPTION OF THE INVENTION

Figure 1:
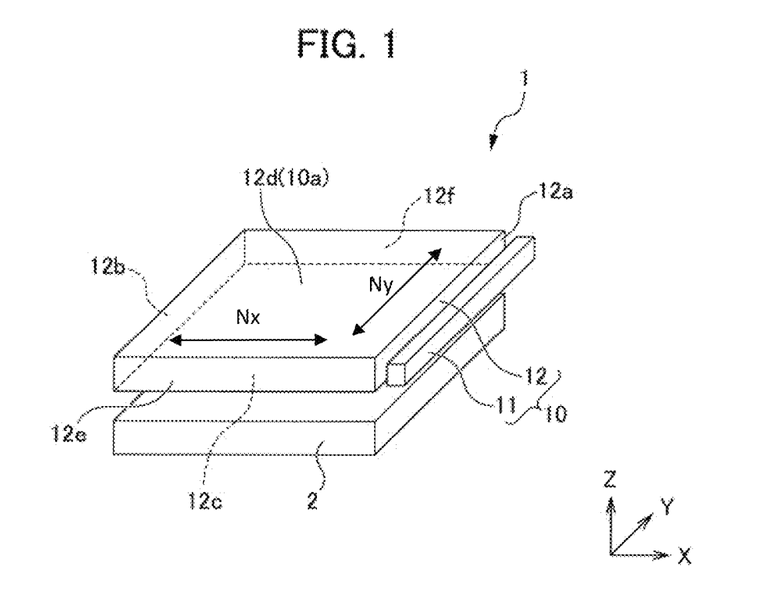
FIG. 1 is a schematic diagram illustrating a display device 1.

Hereinafter, embodiments of the present invention will be described with reference to the drawings. However, the technical scope of the present invention is not limited to the present embodiment. Note that in the drawings used for the description of the embodiments, a size, ratio or the like of each member may be changed or exaggerated as necessary. Hereinafter, embodiments of the present invention will be described with reference to the drawings and the like. Note that each drawing shown below, including FIG. 1, is a schematic view, and the size and shape of each portion are appropriately exaggerated for easy understanding. In this specification, words such as plate and sheet are used, but these words are generally used so that plate, sheet, and film are used in the order of larger thickness, and also in this specification, the words are used in this manner. However, since such use does not have technical significance, the words may be appropriately substituted with one another.

Numerical values of dimensions and the like and a material name and the like of each member described herein are mere examples as embodiments, and are not limited to those shown below, and therefore they may be appropriately selected and used. In this specification, it is assumed that terms which specify shapes and geometric conditions, for example, terms such as parallel and orthogonal also include a state having a similar optical function and having an error that can be regarded as parallel and orthogonal in addition to strict meaning. In this specification, it is assumed that a sheet surface (plate surface, film surface) in each sheet (plate, film) represents a surface in a plane direction of the sheet (plate, film) when viewed as a whole.

EMBODIMENTS

Figure 2A:
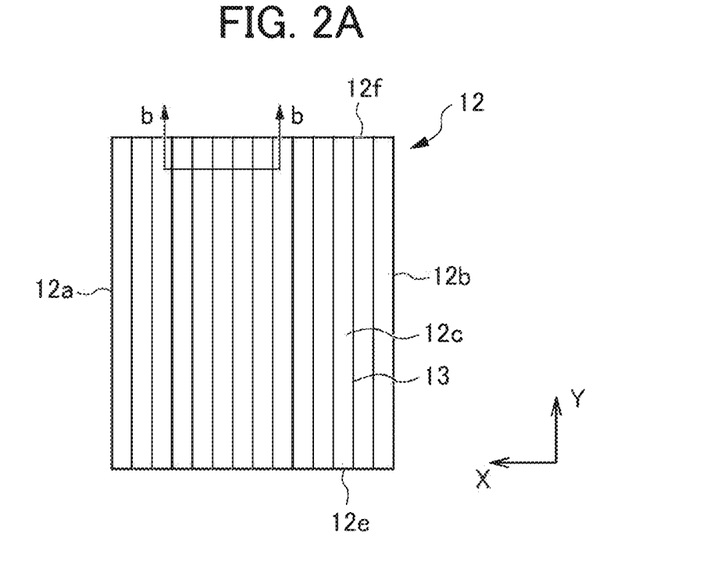
FIG. 2A and FIG. 2B are diagrams illustrating a light guide plate 12.
Figure 2B:
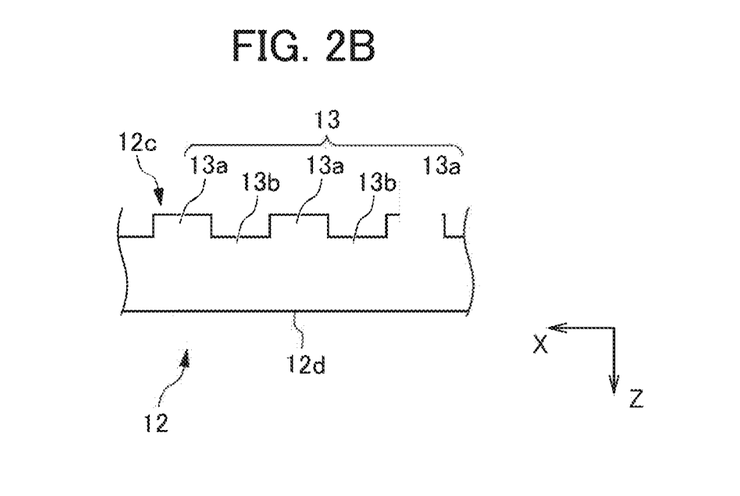

FIG. 1 is a diagram illustrating a display device 1 of the present embodiment. FIG. 2A and FIG. 2B are diagrams illustrating a light guide plate 12 of the present embodiment. FIG. 2A is a plan view of the light guide plate 12, when viewed from a side of a light exit surface 12c, and FIG. 2B is a partial cross-sectional view of an area b of FIG. 2A. Note that in the drawings shown below including FIG. 1 and the following description, in a use state of the display device 1, of two directions parallel to a screen of the display device 1 and orthogonal to each other, a direction orthogonal to a light entrance surface 12a of the light guide plate 12 is referred to as an X direction, and a direction orthogonal to the X direction is referred to as a Y direction, for easy understanding. In addition, a direction (thickness direction) orthogonal to the screen of the display device 1 is referred to as a Z direction. Note that a +Z side of the thickness direction (Z direction) is referred to as an observer side, and a -Z side thereof is referred to as a back side.

The display device 1 of the present embodiment includes an LCD panel 2, and a surface light source device 10. The display device 1 illuminates the LCD panel 2 with the surface light source device 10 from the observer side, and displays image information formed on the LCD panel 2. The screen of the display device 1 of the present embodiment corresponds to a surface (hereinafter, referred to as a "display surface") 10a closest to the +Z side (observer side) in the surface light source device 10, and a "front direction" of the display device 1 represents a normal direction relative to the display surface 10a, is parallel to the Z direction, and coincides with the normal direction relative to a plate surface of the light guide plate 12 (described later), and the like.

The LCD panel 2 is a reflection type display portion that is formed from a liquid crystal display element and forms the image information on the display surface thereof. The LCD panel 2 is formed in a substantially flat plate shape. An external shape of the LCD panel 2 is formed in a rectangular shape when viewed from the Z direction, and has two opposite edges parallel to the X direction and two opposite edges parallel to the Y direction. The surface light source device 10 is a device for illuminating the LCD panel 2 from the observer side (+Z side), and includes a light source portion 11, the light guide plate 12, and the like. The surface light source device 10 is an edge light type surface light source device (front light).

The light source portion 11 is a portion that emits light for illuminating the LCD panel 2. The light source portion 11 is disposed along the Y direction at a position facing the light entrance surface 12a (described later) which is one end surface of the light guide plate 12 (on the +X side) in the X direction. The light source portion 11 is formed to have a plurality of point light sources arranged at a predetermined interval in the Y direction. For the point light source, an LED (Light Emitting Diode) light source is used. Note that the light source portion 11 may be, for example, a linear light source such as a cold-cathode tube, or may be in a form of a light source disposed on an end surface of a light guide extending in the Y direction. In addition, a reflection plate (not illustrated) may be provided to cover the outside of the light source portion 11, from the viewpoint of improving the use efficiency of light emitted by the light source portion 11.

The light guide plate 12 included in the surface light source device 10 is formed in a rectangular shape when viewed from a front direction (Z direction), and has two opposite edges parallel to the X direction, and two opposite edges parallel to the Y direction. The light guide plate 12 is a substantially flat plate-shaped member that guides the light, in which the light emitted from the light source portion 11 enters the light entrance surface 12a, is guided in the light guide plate 12, and then is emitted from the light exit surface 12c. In the present embodiment, the light entrance surface 12a and a facing surface 12b facing each other are located at both end portions (an end portion on the +X side and an end portion on the -X side) of the light guide plate 12 in the X direction, respectively, and correspond to two edges extending parallel to the Y direction when viewed in the normal direction (Z direction) relative to the plate surface. In addition, the light exit surface 12c and a back surface 12d facing each other are located at both end portions (an end portion on the -Z side and an end portion on the +Z side) of the light guide plate 12 in the Z direction, respectively. The plate surface of the light guide plate 12 is parallel to an XY surface, and the back surface 12d as the display surface 10a of the display device 1 is a surface parallel to the plate surface. A first side surface 12e and a second side surface 12f facing each other are located at both end portions (an end portion on the -Y side and an end portion on the +Y side) of the light guide plate 12 in the Y direction, and correspond to two edges extending parallel to the X direction when viewed in the normal direction (Z direction) relative to the plate surface.

The light guide plate 12 allows the light emitted from the light source portion 11 to enter through the light entrance surface 12a, travel to a facing surface 12b side (X2 side) facing the light entrance surface 12a while allowing it to be totally reflected by the light exit surface 12c and the back surface 12d, and then be appropriately emitted from the light exit surface 12c to an LCD panel 2 side (−Z side) while mainly guiding the light in the X direction. The light guide plate 12 of the present embodiment is formed in a rectangular shape when viewed from the thickness direction (Z direction), and among surfaces parallel to the thickness direction, the surfaces parallel to the longitudinal direction (Y direction) are referred to as the light entrance surface 12a and the facing surface 12b, from the viewpoint of guiding more light.

In the present embodiment, as illustrated in FIG. 2A and FIG. 2B, a projection and recess portion 13 is formed on the light exit surface 12c of the light guide plate 12, the projection and recess portion 13 being formed by fine projection and recess features that are alternately formed in a direction (X direction) perpendicular to the light entrance surface 12a. This enables the light guided in the light guide plate 12 to be emitted from the light exit surface 12c as appropriate. As illustrated in FIG. 2B, the projection and recess portion 13 extends in the Y direction of the light guide plate 12, and is comprised of projection portions 13a each having a rectangular cross section and recess portions 13b each having a rectangular cross section, the projection portions 13a and the recess portions 13b being alternately formed in the X direction. The projections and recesses forming the projection and recess portion 13 are formed to be fine in size, and, for example, the depth of the recess portion 13b is about 0.1 μm or more and 3.0 μm or less. In addition, each of the bottom width of the recess portion 13b and the top width of the projection portion 13a is about 1 μm or more and 30 μm or less.

Note that the shape of the projection and recess portion 13 is not limited to the above-described example, and another form may be applied or a plurality of forms may be combined. Examples of a projection and recess portion of another form include a form of having a predetermined cross section to extend to be sloped with respect to the width direction (Y direction) of the light guide plate 12, a form of having a two-dimensional shape in which a plurality of conical projection portions are arranged in a matrix configuration on the plan view, and a form in which a plurality of projection portions are arranged in a dot-like manner on the plan view.

The light guide plate 12 can be formed of various materials. Examples thereof include thermoplastic resins such as a polymer resin having an alicyclic structure, a methacrylate resin, a polycarbonate resin, a polystyrene resin, an acrylonitrile-styrene copolymer, a methyl methacrylate-styrene copolymer, an ABS resin, and polyether sulfone, and an epoxy acrylate or urethane acrylate reactive resin. These materials are widely used as materials for an optical member such as a light guide plate, have excellent mechanical characteristics, optical characteristics, stability, processability, and the like, and are inexpensively available.

Here, the light guide plate 12 of the present embodiment is formed so that the refractive index Nx in the direction (X direction or a direction from the light entrance surface 12a toward the facing surface 12b) perpendicular to the light entrance surface 12a is higher than the refractive index Ny in the width direction (Y direction or a direction from the first side surface 12e toward the second side surface 12f) parallel to the light exit surface 12c and parallel to the light entrance surface 12a (Nx>Ny). In this way, the light guide plate 12 of the present embodiment can emit uniformly, from the light exit surface, the light that enters through the light entrance surface 12a and is guided in the light guide plate 12. If the refractive index Nx in the direction perpendicular to the light entrance surface 12a is lower than the refractive index Ny in the width direction (Nx<Ny), the light that has entered through the light entrance surface may leak, and in this case, emission lines are seen in the light exit surface and luminance unevenness occurs, which is not desirable.

It is believed that when the refractive index (Nx) in the X direction (light guide direction) perpendicular to the light entrance surface is lower than the refractive index (Ny) in the Y direction (Nx<Ny), the light that has entered through the light incident surface tends to travel in the light guide direction (X direction), and converges too much in the X direction, resulting in being easily seen as the emission lines. On the other hand, it is believed that when the refractive index in the X direction (light guide direction) is higher than the refractive index in the Y direction (Nx>Ny), a part of the light that has entered through the light incident surface is dispersed and travels in a direction intersecting with the X direction, thereby preventing the light from converging too much in the X direction, which suppresses the occurrence of the emission lines. The light guide plate 12 of the present embodiment is formed of a polycarbonate resin having optical anisotropy, and the refractive index Nx in a direction perpendicular to the light entrance surface 12a is 1.59, and the refractive index Ny in a direction perpendicular to the first side surface 12e is 1.58.

Here, the light guide plate 12 is particularly effective when being used as a front light as in the display device 1 of the present embodiment. In the light guide plate used for a back light, since not only an LCD panel but also a diffusion plate, a prism sheet, and the like are arranged on the light exit surface of the light guide plate, even when the above-described emission lines are generated on the light exit surface of the light guide plate, the emission lines are hardly conspicuous by the diffusion plate and the like in some cases. In contrast, in the light guide plate 12 used for a front light, the back surface 12d of the light guide plate serves as the display surface 10a of the display device 1, and therefore a possibility that the emission lines are seen is extremely high when the emission lines are generated. Accordingly, when the light guide plate 12 satisfying Nx>Ny is provided in the surface light source device 10 as in the display device 1 of the present embodiment, the above-described emission lines can be prevented from being seen.

Since the display device 1 of the present embodiment includes the reflection type LCD panel 2 as described above, when an amount of incident light such as external light into the LCD panel 2 is sufficient, the light source portion 11 provided in the surface light source device 10 is used in an off state. On the other hand, when the amount of incident light into the LCD panel 2 is insufficient and therefore an image displayed on the display surface 10a is dark, the display device 1 is used in a state where the light source portion 11 emits light. Therefore, when the display device 1 is designed to be disposed at a relatively light place, a time period for which the light source portion 11 is lighted is considerably shorter, and therefore, the number of point light sources used in the light source portion 11 is reduced, in some cases, from the viewpoint of reducing the cost and reducing the power consumption of the display device 1. In such a case, when the refractive index in the light guide direction (X direction) is lower than that in the Y direction (Nx<Ny), the interval between the point light sources becomes wider, and the emission lines may be seen more prominently. However, as in the present embodiment, the refractive index in the light guide direction (X direction) is made higher than the refractive index in the Y direction (Nx>Ny), whereby the emission lines can be prevented from being seen even in such a case.

It is preferable that the thickness of the light guide plate 12 (a distance from the light exit surface 12c (a top portion of a projection portion) to a back surface 12d, in the thickness direction of the light guide plate) is 0.1 mm to 1.0 mm. If the thickness of the light guide plate 12 is 0.1 mm or less, the number of times of reflection of light being guided in the light guide plate becomes too large. If the thickness of the light guide plate 12 is 1.0 mm or more, the number of times of reflection of light being guided in the light guide plate becomes too small. Therefore, both cases are not preferable because it is difficult to uniformly emit the light from the light exit surface of the light guide plate. Note that the thickness of the light guide plate 12 of the present embodiment is, for example, 0.4 mm. A refractive index difference between the refractive index Nx and the refractive index Ny of the light guide plate 12 (Nx−Ny) is preferably 0.002 or more, more preferably 0.005 or more, and further preferably 0.01 or more, from the viewpoint of effectively preventing the above-described emission lines from being seen. Note that, since the refractive index difference varies depending on the thickness of the light guide plate, more specifically, tends to be reduced when the thickness of the light guide plate is reduced, it is preferable that the refractive index difference is 0.002 or more when the thickness of the light guide plate 12 is 0.1 mm which is a lower limit value of the above-described preferable range.

(Manufacturing Method for Light Guide Plate 12)

Figure 3:
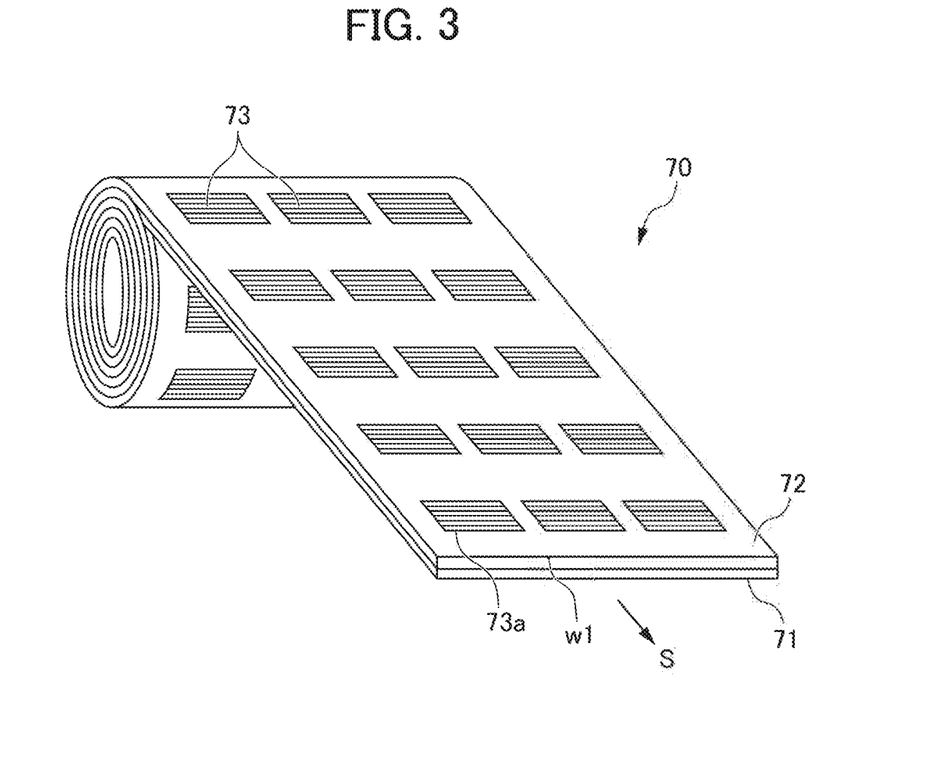
FIG. 3 is a diagram illustrating a shaped sheet used for manufacturing the light guide plate 12 in detail.

Here, before describing a manufacturing method for the light guide plate 12, a shaped sheet 70 used for forming the light guide plate 12 will be described. FIG. 3 is a diagram illustrating the shaped sheet 70 used for forming the light guide plate 12. As illustrated in FIG. 3, the shaped sheet 70 is a long forming plate made of a resin having flexibility, in which a forming layer 72 is stacked over a base material portion 71, and is wound into a roll before manufacturing the light guide plate 12. The base material portion 71 is a base material serving as a base of the shaped sheet 70, and is formed of, for example, a polyethylene terephthalate (PET) resin. Note that, in addition to the PET resin, transparent resins such as a polycarbonate (PC) resin, a methyl methacrylate-butadiene-styrene (MBS) resin, a methyl methacrylate-styrene (MS) resin, an acrylic-styrene (AS) resin, and an acrylonitrile-butadiene-styrene (ABS) resin can be also used. The forming layer 72 is a layer in which a projection and recess shaped portion 73 corresponding to the projection and recess portion 13 of the light guide plate 12 is formed on a surface (front surface) opposite to the base material portion 71 side. The forming layer 72 is formed of, for example, a urethane acrylate ultraviolet curable resin. Note that, in addition to the urethane acrylate ultraviolet curable resin, ultraviolet curable resins such as polyester acrylate, epoxy acrylate, polyether acrylate, polythiol, and butadiene acrylate can be also used. In addition to the above-described ultraviolet curable resin, an electron beam-curable resin can be used as an energy ray-curable resin. A plurality of projection and recess shaped portions 73 to be provided on the forming layer 72 are arranged on the front surface of the forming layer 72, to simultaneously form a plurality of light guide plates 12. In the present embodiment, the plurality of projection and recess shaped portions 73 are formed in three rows in a direction parallel to a short edge of the long shaped sheet 70 and in a plurality of stages in a direction parallel to a long edge thereof.

Figure 4:
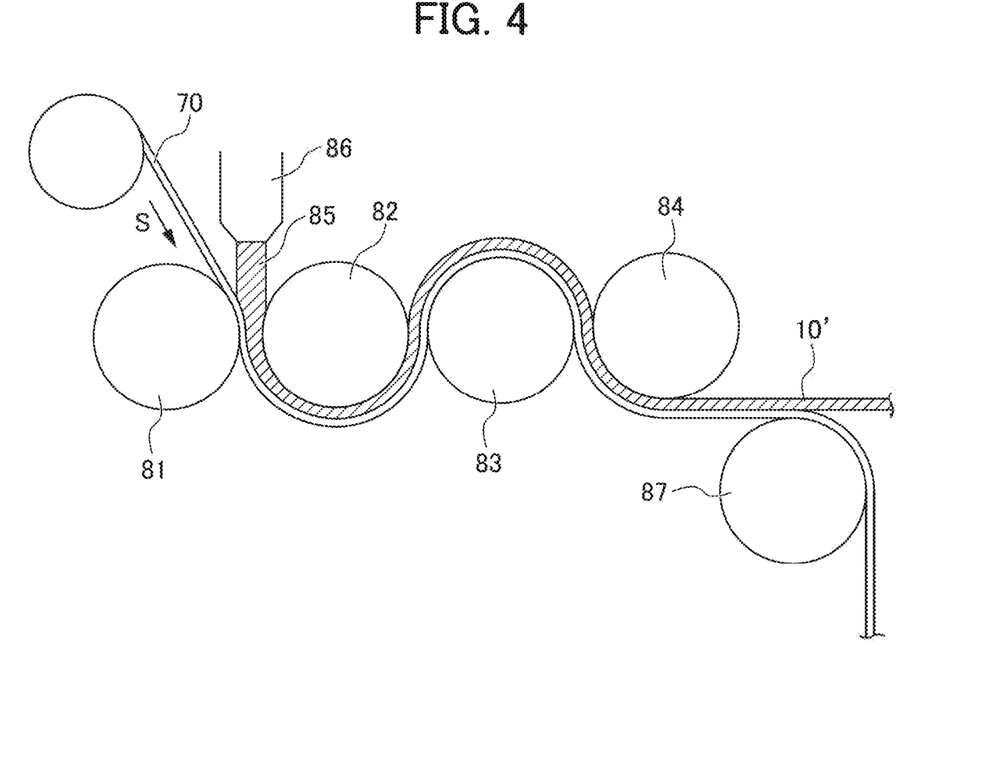
FIG. 4 is a diagram illustrating a manufacturing method for the light guide plate 12.

Next, a method of manufacturing the light guide plate 12 by extrusion will be described. FIG. 4 is a diagram illustrating the manufacturing method for the light guide plate 12. First, as illustrated in FIG. 4, the shaped sheet 70 wound into a roll is wound off, and is successively conveyed between a first roll 81 and a second roll 82 disposed to provide a predetermined space with respect to the first roll 81. Here, a conveying direction S of the shaped sheet 70 is a direction parallel to a direction perpendicular to the short edge of the shaped sheet 70. A melted thermoplastic resin composition 85 (resin forming the light guide plate) is extruded between a surface of the shaped sheet 70 on a side in which the projection and recess shaped portions 73 are formed and the second roll 82, from a nozzle 86 (resin extrusion step).

Next, the extruded thermoplastic resin composition 85 is sandwiched and pressed between the first roll 81 and the second roll 82 while being conveyed together with the shaped sheet 70, to form the light guide plates 12 (light guide plate forming step). In this way, the thermoplastic resin composition 85 is filled into the projection and recess shaped portions 73 provided on the front surface of the forming layer 72 (see FIG. 3) of the shaped sheet 70, and is hardened by cooling with the second roll 82 and ambient air (outside air, an operating environment of a manufacturing device, and the like), thereby being formed in a shape along the projection and recess shaped portion 73 of the shaped sheet 70. Then, the thermoplastic resin composition 85 is further cooled through a third roll 83 and a fourth roll 84, so that the final shape is fixed. In this way, a sheet 10' with multiple light guide plates can be obtained in which multiple light guide plates 12 are arranged in a matrix configuration. Next, a peeling roll 87 is used to separate the sheet 10' with multiple light guide plates from the shaped sheet 70. Finally, the sheet 10' with multiple light guide plates is punched, cut or the like, so that a plurality of light guide plates 12 (see FIG. 2A) can be individually obtained.

Therefore, as a result of an exhaustive study by the inventors of the present invention, it has been found that since the thermoplastic resin composition 85 extruded from the nozzle 86 extends in the conveying direction S, the refractive index in the conveying direction S tends to be higher than the refractive index in the direction perpendicular to the conveying direction S. Thus, in the present embodiment, as illustrated in FIG. 3, each of the projection and recess shaped portions 73 provided on the shaped sheet 70 is formed so that a surface 73a corresponding to the light entrance surface 12a of the light guide plate 12 (a surface parallel to the longitudinal direction of the light guide plate 12) is parallel to the short edge w1 of the shaped sheet 70. That is, each of the projection and recess shaped portions 73 provided on the shaped sheet 70 is arranged on the forming layer 72 so that the surface 73a corresponding to the light entrance surface 12a of the light guide plate 12 is orthogonal to the conveying direction S of the shaped sheet 70.

Therefore, the thermoplastic resin composition 85 extruded from the nozzle 86 extends in the direction perpendicular to the surface 73a of the projection and recess shaped portion 73, the surface 73a serving as the light entrance surface 12a of the light guide plate 12. In this way, the produced sheet 10' with multiple light guide plates (light guide plates 12) is formed so that the refractive index Nx in the direction (light guide direction) perpendicular to the light entrance surface 12a of the light guide plate 12 is higher than the refractive index Ny in the direction perpendicular to the first side surface 12e. As described above, the light guide plate 12 satisfying the refractive index Nx>the refractive index Ny is manufactured. Note that the refractive index difference between the refractive index Nx and the refractive index Ny can be adjusted by appropriately adjusting the resin temperature and cooling temperature of the thermoplastic resin composition 85 extruded from the nozzle 86, the conveying speed of the shaped sheet 70, tension in the conveying direction S, and the like.

Since the light guide plate was conventionally manufactured by an injection molding or the like, as disclosed in, for example, Japanese Unexamined Patent Application, Publication No. Hei10-142601, the light guide plate satisfying Nx>Ny could not be manufactured like the light guide plate 12 of the present embodiment. It is also possible to manufacture the light guide plate 12 satisfying Nx>Ny by forming the projection and recess portion 13 in one surface of a resin film having optical anisotropy, but in this case, it may be very difficult to form a desired projection and recess portion with high accuracy, which may cause an increase in the manufacturing cost. In contrast, as described above, the shaped sheet 70 and the extrusion method are used, whereby the light guide plate 12 satisfying Nx>Ny can be manufactured more easily and less expensively.

(Evaluation of Luminance Unevenness)

Figure 5A:
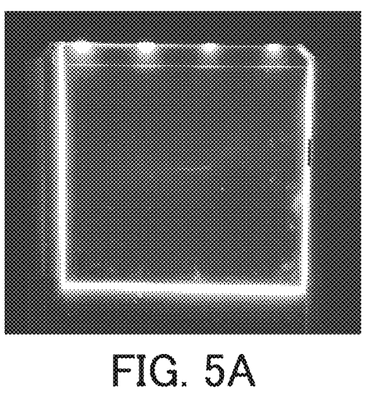
FIG. 5A to FIG. 5D are photographs in Example and Comparative Example, each showing, in a light exit surface, a light emitting state of light that has entered the light guide plate.
Figure 5B:
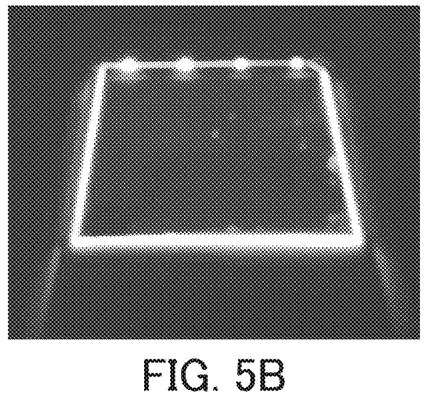
Figure 5C:
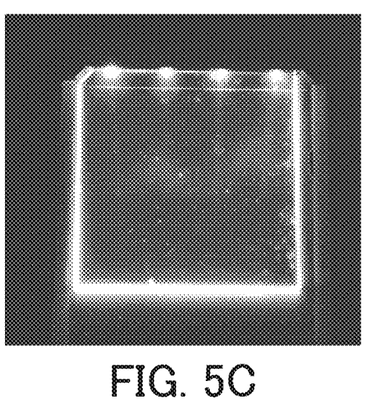
Figure 5D:
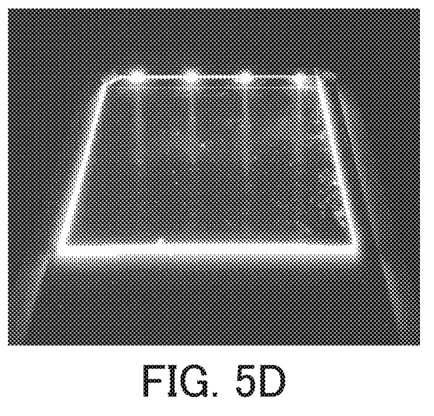

Next, there will be described evaluation results of relationships between the refractive index in the direction perpendicular to the light entrance surface of the light guide plate and the refractive index in the direction perpendicular to each side surface, and the occurrence of luminance unevenness in the light exit surface of the light guide plate. FIG. 5A to FIG. 5D are photographs in Example and Comparative Example, each showing, in the light exit surface, a light emitting state of the light that has entered the light guide plate. FIG. 5A is a photograph which is taken from a direction perpendicular to the light exit surface of the light guide plate of Example, and FIG. 5B is a photograph which is taken from a direction inclined by 45 degrees with respect to the light exit surface of the light guide plate of Example. FIG. 5C is a photograph which is taken from a direction perpendicular to the light exit surface of the light guide plate of Comparative Example, and FIG. 5D is a photograph which is taken from a direction inclined by 45 degrees with respect to the light exit surface of the light guide plate of Comparative Example.

The light guide plate of Example used for the evaluation is formed in a manner similar to the light guide plate 12 of the above-described embodiment, and is formed of a polycarbonate resin. In the light guide plate of Example, the refractive index Nx in the direction (light guide direction) perpendicular to the light entrance surface is set to 1.59, and the refractive index Ny in the direction (direction perpendicular to each side surface) from the first side surface toward the second side surface is set to 1.58, so that the refractive index Nx is higher than the refractive index Ny (Nx>Ny). The light guide plate of Comparative Example is formed of a polycarbonate resin. In light guide plate of Comparative Example, the refractive index Nx in the direction (light guide direction) perpendicular to the light entrance surface is set to 1.58, and the refractive index Ny in the direction (direction perpendicular to each side surface) from the first side surface toward the second side surface is set to 1.59, so that the refractive index Nx is lower than the refractive index Ny (Nx<Ny).

Here, the refractive indexes Nx and Ny of each light guide plate were measured using KOBRA series measurement device (KOBRA-WR) made by Oji Scientific Instruments Co., Ltd. As the light guide plates of Example and Comparative Example used for measurement of the refractive indexes, plate-like test samples in which no projection and recess portion is provided on the light exit surface were used. In the above-described measurement device, a light source portion, a polarizer, an analyzer, and a light-receiving portion were arranged in order, and a mounting stage for the test sample was provided between the polarizer and the analyzer. Each test sample described above was mounted on the mounting stage, a single-wavelength beam was emitted from the light source portion, and a phase difference and an orientation angle of the test sample were measured from angular dependence of transmitted light intensity when the test sample was rotated once around a beam axis while the polarizer and the analyzer are arranged in a parallel nicols state, thereby obtaining the refractive indexes in the X direction and the Y direction. Here, a beam having a wavelength of 590 nm was used for the beam emitted from the light source portion.

As shown in FIG. 5C and FIG. 5D, in the light guide plate of Comparative Example, it was confirmed that leakage of the light that entered through the light entrance surface was seen as emission lines in the light exit surface. In contrast, in the light guide plate of Example, as shown in FIG. 5A and FIG. 5B, it was confirmed that leakage of the light that entered through the light entrance surface was suppressed as much as possible, was significantly prevented from being seen as emission lines in the light exit surface, and the light was uniformly emitted.

As described above, the light guide plate 12 of the present embodiment is formed so that the refractive index Nx in the direction (direction perpendicular to the light entrance surface 12*a*) from the light entrance surface 12*a* toward the facing surface 12*b* is higher than the refractive index Ny in the direction (direction perpendicular to each side surface) from the first side surface 12*e* toward the second side surface 12*f* (Nx>Ny). Thus, the light guide plate 12 can prevent the luminance unevenness from occurring in the light emitted from the light exit surface 12*c*, and can emit the guided light uniformly from the light exit surface 12*c*.

In the manufacturing method for the light guide plate 12 of the present embodiment, the surface 73*a* of the projection and recess shaped portion 73 of the shaped sheet 70, the surface 73*a* corresponding to the light entrance surface 12*a* of the light guide plate 12, is disposed to be orthogonal to the conveying direction S of the resin, whereby the light guide plate 12 satisfying the refractive index Nx>the refractive index Ny can be manufactured easily.

Although embodiments of the present invention are described above, the present invention is not limited to the embodiments described above, and, as in variation forms which will be described later, various variations and modifications are possible, and they also fall within the technical scope of the present invention. The effects described in the embodiments are simply a list of the most preferred effects produced from the present invention, and there is no limitation to the effects described in the embodiments. Although the embodiments described above and the variation forms which will be described later can be used by being combined as necessary, the detailed description thereof will be omitted.

(Variation Forms)

(1) In the above-described embodiment, there is described an example in which the light guide plate 12 is used for the front light of the display device, but the present invention is not limited thereto, and the light guide plate 12 may be used for a back light of a transmission type display device. In this case, the LCD panel needs to be of the transmission type that transmits the light from the back side. A light control sheet such as a prism sheet, or a light diffusion sheet may be provided between the LCD panel and the light guide plate.

(2) In the above-described embodiment, there is described an example in which the light guide plate 12 is formed by the shaped sheet 70 that is wound off, but the present invention is not limited thereto. For example, the light guide plate 12 may be manufactured using a roll plate in which a projection and recess shaped portion is formed on a cylindrical peripheral side surface, instead of using the shaped sheet.

(3) In the above-described embodiment, there is described an example in which the display surface 10a of the display device 1 serves as the back surface 12d of the light guide plate 12, but the present invention is not limited thereto, and a transparent protective sheet for preventing scratching of the light guide plate may be attached to the back surface 12d of the light guide plate 12, so that a front surface of the protective sheet serves as the display surface. In this case, it is desirable that the material having the refractive index lower than that of the material used for the light guide plate 12 is applied to a joint layer for joining the back surface 12d of the light guide plate 12 and the protective sheet, from the viewpoint of efficiently totally reflecting the light in the light guide plate 12. When the light guide plate 12 is formed of a polycarbonate resin as in the above-described embodiment, it is desirable that for example, an acryl resin having the refractive index lower than that of the polycarbonate resin is used for the joint layer.

(4) In addition, the light exit surface 12c of the light guide plate 12 and the LCD panel 2 may be joined by a transparent joining member. At this time, the joining member may be provided to fill the projection and recess shape formed on the light exit surface 12c of the light guide plate 12. Note that, also in this case, it is desirable that a material having the refractive index lower than that of the material used for the light guide plate 12 is used for the joining member, from the viewpoint of efficiently totally reflecting the light in the light guide plate 12.

EXPLANATION OF REFERENCE NUMERALS 1 display device
10 surface light source device
11 light source portion
12 light guide plate
12a light entrance surface
13 projection and recess portion
70 shaped sheet
71 base material portion
72 forming layer
73 projection and recess shaped portion

The invention claimed is:

1. A surface light source device, comprising: a light guide plate having a thickness; and a light source portion that is provided at a position facing a light entrance surface of the light guide plate and emits light to the light entrance surface, the light guide plate comprising: the light entrance surface which is parallel to a direction of the thickness of the light guide plate and through which the light enters; a light exit surface which is perpendicular to the light entrance surface and perpendicular to the direction of the thickness and from which the light is emitted; and a facing surface that faces the light entrance surface, wherein the light having entered through the light entrance surface is guided to the facing surface side, and is emitted from the light exit surface, wherein (i) a refractive index Nx of the light guide plate in an orientation perpendicular to the light entrance surface and perpendicular to the thickness, and (ii) a refractive index Ny of the light guide plate in an orientation parallel to the light exit surface and parallel to the light entrance surface, and wherein the refractive index Nx is higher than the refractive index Ny.

2. A display device, comprising:
the surface light source device according to claim 1; and
a display portion that is disposed on a side of the light exit surface of the light guide plate provided in the surface light source device.

3. The surface light source device according to claim 1, wherein a projection and recess portion is formed on the light exit surface, the projection and recess portion extending in a direction parallel to the light entrance surface and being formed by fine projection and recess features that are alternately formed in a direction perpendicular to the light entrance surface.

4. The surface light source device according to claim 1, wherein the light guide plate has a thickness of 0.1 mm to 1.0 mm.

5. The surface light source device according to claim 1, wherein a difference (Nx−Ny) between the refractive index Nx and the refractive index Ny of the light guide plate is 0.002 or more.

6. The surface light source device according to claim 1, wherein the light guide plate has a thickness of 0.1 mm to 1.0 mm, and a difference (Nx−Ny) between the refractive index Nx and the refractive index Ny of the light guide plate is 0.002 or more.

7. The display device according to claim 2, wherein the display portion is a reflection type display portion.

8. The surface light source device according to claim 3, wherein the recess portion has a depth of about 0.1 μm or more and 3.0 μm or less, and a bottom width of about 1 μm or more and 30 μm or less, and the projection portion has a top width of about 1 μm or more and 30 μm or less.

* * * * *